(12) United States Patent
Miller

(10) Patent No.: US 9,622,498 B2
(45) Date of Patent: Apr. 18, 2017

(54) ROASTED COFFEE WITH RESVERATROL

(71) Applicant: Vera Roasting Company, Inc., Portsmouth, NH (US)

(72) Inventor: Glen P. Miller, Lee, NH (US)

(73) Assignee: Vera Roasting Company, Inc., Portsmouth, NH (US)

( * ) Notice: Subject to any disclaimer, the term of this patent is extended or adjusted under 35 U.S.C. 154(b) by 0 days.

(21) Appl. No.: 15/166,611

(22) Filed: May 27, 2016

(65) Prior Publication Data
US 2017/0013856 A1  Jan. 19, 2017

Related U.S. Application Data

(60) Provisional application No. 62/193,737, filed on Jul. 17, 2015.

(51) Int. Cl.
*A23L 2/00* (2006.01)
*A23F 5/14* (2006.01)
(Continued)

(52) U.S. Cl.
CPC ............... *A23F 5/145* (2013.01); *A23F 5/40* (2013.01); *A23L 1/3004* (2013.01);
(Continued)

(58) Field of Classification Search
CPC . A23F 5/145; A23F 5/40; A23F 5/405; A23V 2200/22; A23V 2200/238
(Continued)

(56) References Cited

U.S. PATENT DOCUMENTS 7,758,903 B2   7/2010   Randolph et al.
7,838,050 B2   11/2010  Randolph et al.
(Continued)

FOREIGN PATENT DOCUMENTS

JP    2015070820   * 10/2013

OTHER PUBLICATIONS

Made How, Flavored Coffee Bean, 2006, http://www.madehow.com/Volume-3/Flavored-Coffee-Bean.html, pp. 1-6.*
(Continued)

*Primary Examiner* — Helen F Heggestad
(74) *Attorney, Agent, or Firm* — Pierce Atwood LLP; Kevin M. Farrell; David J. Wilson

(57) ABSTRACT

The present invention describes new compositions of matter comprising (1) roasted coffee beans in either whole bean form or in ground form to which a formulation containing resveratrol and glycerin and/or specified additional additives have been added, (2) liquid beverages extracted at a pressure of less than 2000 bar from said roasted coffee beans or grounds to which a formulation containing resveratrol and glycerin and/or specified additional additives have been added; and (3) so-called "instant coffee" or "soluble coffee" prepared from roasted coffee beans to which a formulation containing resveratrol and glycerin and/or specified additional additives have been added, but in which a pulverized coffee component is specifically excluded. The formulation including glycerin leads to increased solubility and bioavailability of resveratrol. By adding a formulation containing resveratrol and glycerin to roasted coffee beans and/or instant coffee, consumers enjoy the health benefits of resveratrol in their coffee without drinking red wine.

24 Claims, 1 Drawing Sheet

*trans*-3,5,4'-trihydroxystilbene
or
*trans*-resveratrol

*cis*-3,5,4'-trihydroxystilbene
or
*cis*-resveratrol

(51) Int. Cl.
    *A23F 5/40*     (2006.01)
    *A23L 1/30*     (2006.01)
    *A23L 1/303*    (2006.01)
    *A23L 1/304*    (2006.01)

(52) U.S. Cl.
    CPC ............ *A23L 1/3002* (2013.01); *A23L 1/303* (2013.01); *A23L 1/304* (2013.01); *A23L 1/3006* (2013.01); *A23V 2002/00* (2013.01)

(58) Field of Classification Search
    USPC .......................... 426/595, 598, 629, 93, 541
    See application file for complete search history.

(56) References Cited

U.S. PATENT DOCUMENTS

| | | |
|---|---|---|
| 8,414,953 B2 | 4/2013 | Robinson et al. |
| 8,524,306 B2 | 9/2013 | Robinson et al. |
| 8,535,748 B2 | 9/2013 | Robinson et al. |
| 8,541,042 B2 | 9/2013 | Robinson et al. |
| 2010/0009039 A1 | 1/2010 | Robinson et al. |
| 2011/0086137 A1 | 4/2011 | Robinson et al. |
| 2011/0091610 A1 | 4/2011 | Robinson et al. |
| 2011/0293791 A1 | 12/2011 | Robinson et al. |
| 2012/0100258 A1 | 4/2012 | Robinson et al. |
| 2012/0100261 A1 | 4/2012 | Robinson et al. |
| 2012/0107457 A1 | 5/2012 | Robinson et al. |
| 2013/0177672 A1 | 7/2013 | Robinson et al. |
| 2013/0260004 A1 | 10/2013 | Robinson et al. |
| 2014/0271988 A1 | 9/2014 | Robinson et al. |
| 2014/0272077 A1 | 9/2014 | Robinson et al. |

OTHER PUBLICATIONS

Internet Archive Wayback, 2006, https://archive.org, p. 1.*

* cited by examiner

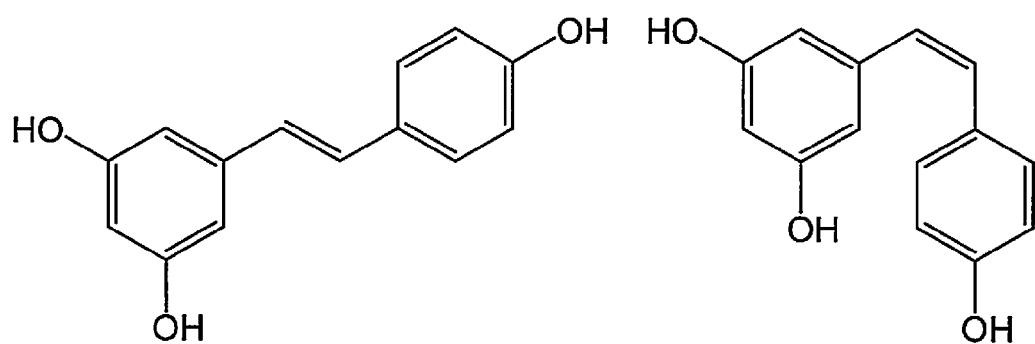
trans-3,5,4'-trihydroxystilbene
or
trans-resveratrol
cis-3,5,4'-trihydroxystilbene
or
cis-resveratrol

ROASTED COFFEE WITH RESVERATROL

BACKGROUND

Coffee is a popular liquid beverage that is brewed from roasted coffee beans. It is consumed in nearly all parts of the world. Coffee also includes 'instant coffee' or 'soluble coffee' which is a powder prepared from dried or freeze-dried coffee. Instant coffee is largely or entirely soluble in water and is typically dissolved in water prior to consumption. Coffee and instant coffee may be served at any temperature, hot or cold.

Coffee is thought by some to have health benefits. The popularity of coffee makes it an ideal vehicle for providing further health benefits to the coffee drinking public.

SUMMARY OF THE INVENTION

A formulation has been developed that is composed of resveratrol and glycerin, as well as a method to infuse this formulation into (for example, by soaking or under pressure) or spray or drip onto roasted coffee beans. The resveratrol/glycerin formulation of the present invention leads to an increased solubility and bioavailability of resveratrol following grinding and brewing of the treated, roasted coffee beans as compared to a formulation without glycerin.

Resveratrol is a stilbenoid, a type of natural phenol, and a phytoalexin produced naturally by several plants in response to injury or when the plant is under attack by pathogens such as bacteria or fungi. Food sources of resveratrol include the skin of grapes, blueberries, raspberries and mulberries. Resveratrol has antioxidant properties. Antioxidants protect the body from damage caused by harmful molecules called free radicals. Many experts believe free radical damage is a factor in the development of blood vessel disease (atherosclerosis), cancer and other conditions. For example, resveratrol has recently been listed in a peer-reviewed journal article as a natural substance that could help prevent and treat cancer, without the toxicity found in anti-cancer drugs, by inhibiting one or more pathways that contribute to cell proliferation. (Shankar, E., et al., Dietary phytochemicals as epigenetic modifiers in cancer: Promise and challenges, Seminars in Cancer Biology, Apr. 23, 2016, ePub ahead of print). Red wine has been shown to have health benefits that are believed to be related to the relatively high concentration of resveratrol in it. A serving of red wine (about 5-6 fluid ounces) is known by one of skill in the art to typically contain a range from about 0.5 to 1.5 milligrams of resveratrol. Thus, the present invention will help coffee drinkers obtain the health benefits available from resveratrol by providing, for example, a substantially equivalent concentration of resveratrol as is found in a serving of red wine (i.e., about 0.5 to about 1.5 mg), or concentrations ranging higher or lower than 0.5 to 1.5 mg that would be predicted to yield desired benefits. For example, a concentration of resveratrol from about 0.1 mg to about 5.0 mg, to about 10 mg, to about 20 mg, to about 50 mg, to about 100 mg, to about 500 mg or to about 1000 mg of resveratrol or greater, in a serving of coffee is contemplated. Put another way, the resveratrol concentration in a serving of coffee (approximately 8 fluid oz. coffee) can be from about 0.1 times to about 2 times, to about 5 times, to about 10 times, to about 100 times, to about 500 times or to about 1000 times that found in a typical glass of red wine.

The present invention describes new compositions of matter including (1) roasted coffee beans in either whole bean form or in ground form (i.e., after grinding the whole, roasted bean) to which a formulation containing (i.e., "consisting of," "consisting essentially of" or "comprising") resveratrol and glycerin and/or specified additional additives have been added, (2) liquid beverages extracted at a pressure of less than 2000 bar from said roasted coffee beans or grounds (grinds) to which a formulation containing resveratrol and glycerin and/or specified additional additives have been added; and (3) so-called "instant coffee" or "soluble coffee" prepared from roasted coffee beans to which a formulation containing resveratrol and glycerin and/or specified additional additives have been added, but in which a pulverized coffee component (wherein the pulverized coffee component has not been extracted) is specifically excluded.

Special additional additives include: ground or pulverized cocoa beans, ground or pulverized vanilla beans, vitamins including vitamin D, antioxidant(s) (such as, but not limited to, resveratrol), nutraceutical(s), dietary fiber, omega-3 oil, omega-6 oil, omega-9 oil, flavonoid(s), lycopene, selenium, beta-carotene(s), vegetable extract(s), hawthorn berry, nattokinase, fish oil, co-enzyme Q-10, garlic, niacin, magnesium, and guggul.

By adding a formulation containing resveratrol and glycerin to roasted coffee beans and/or instant coffee, consumers enjoy the health benefits of resveratrol in their coffee without drinking red wine.

By adding other specified additives to roasted coffee beans and/or instant coffee, consumers may enjoy additional health benefits in their coffee.

DESCRIPTION OF THE FIGURES

FIG. 1 shows the chemical structure of trans-resveratrol and cis-resveratrol.

DETAILED DESCRIPTION OF THE INVENTION

Description of Related Art

US Patent Application 20140272077 (Sep. 18, 2014; the '077 application) entitled "ENHANCED EXTRACTS OF FOOD AND BEVERAGE COMPONENTS" by Robinson, et al., describes only green coffee extracts. Claim 16 references an edible raw material with a high concentration of chlorogenic acid. The term "edible raw material" is clearly referring to a green coffee bean as it is well known that Chlorogenic acid is present in green coffee beans but its concentration falls rapidly upon roasting: a 60% decrease in chlorogenic acid concentration is observed under mild roasting conditions while a 100% decrease in concentration is observed under severe roasting conditions [*A study of the effect of roasting on the chlorogenic acid composition of coffee using HPLC*, L. C. Trugo and R. Macrae, Food Chemistry, Volume 15, Issue 3, 1984, Pages 219-227]. The '077 application does not refer to roasted coffee beans or their extracts.

US Patent Application 20140271988 (Sep. 18, 2014; the '988 application) entitled "ENHANCED EXTRACTS OF FOOD AND BEVERAGE COMPONENTS" by Robinson, et al., describes and claims methods to make green coffee extracts, an edible raw material with a relatively high concentration of chlorogenic acid. US Patent Application 20140271988 does not refer to compositions of matter related to roasted coffee beans or their extracts.

US Patent Applications 20130260004 (Oct. 3, 2013), 20110293791 (Dec. 1, 2011), 20110091610 (Apr. 21, 2011), 20110091609 (Apr. 21, 2011), 20110086137 (Apr. 14, 2011), and 20100009039 (Jan. 14, 2010), all entitled "BEVERAGES WITH ENHANCED FLAVORS AND AROMAS AND METHOD OF MAKING SAME" and all by Robinson, et al., describe and claim soluble coffees with a special and unique composition of matter that includes, in all cases, a pulverized coffee component wherein the pulverized coffee component has not been extracted and "wherein the pulverized coffee component is added to the dry coffee extract component." Adding pulverized coffee component to soluble or instant coffee clearly changes its composition of matter.

US Patent Application 20120107457 (May 3, 2012) entitled "BEVERAGES WITH ENHANCED FLAVORS AND AROMAS," by Robinson, et al., describes and claims a special and unique composition of matter that includes a "soluble coffee beverage comprising: a carbohydrate component; a dry coffee extract component; and a pulverized coffee component, wherein the pulverized coffee component has not been extracted, and wherein the pulverized coffee component has been added to the dry coffee extract". As adding carbohydrates, pulverized coffee and other special ingredients to soluble or instant coffee clearly changes its composition of matter.

US Patent Application 20120100261 (Apr. 26, 2012) entitled "BEVERAGES WITH ENHANCED FLAVORS AND AROMAS," by Robinson, et al., describes and claims a special and unique composition of matter that includes a "soluble coffee beverage comprising: a flavoring component; a dry coffee extract component; and a pulverized coffee component, wherein the pulverized coffee component has not been extracted, and wherein the pulverized coffee component has been added to the dry coffee extract." Adding flavorings, pulverized coffee and other special ingredients to soluble or instant coffee clearly changes its composition of matter.

US Patent Application 20120100258 (Apr. 26, 2012) entitled "BEVERAGES WITH ENHANCED FLAVORS AND AROMAS," by Robinson, et al., describes and claims a special and unique composition of matter that includes a "soluble coffee beverage comprising: a dairy component; a dry coffee extract component; and a pulverized coffee component, wherein the pulverized coffee component has not been extracted, and wherein the pulverized coffee component has been added to the dry coffee extract." Adding dairy components, pulverized coffee and other special ingredients to soluble or instant coffee clearly changes its composition of matter.

US Patent Application 20130177672 (Jul. 11, 2013) entitled "BEVERAGES AND EXTRACTS WITH ENHANCEMENTS" by Robinson, et al., describes and claims various extracts prepared "at an extraction pressure of at least about 2000 bar." The present application claims only extracts prepared at pressures less than 2000 bar.

U.S. Pat. No. 7,838,050 B2 (issue date: Nov. 23, 2010) by Randolph, et al., is entitled CYTOKINE MODULATORS AND RELATED METHOD OF USE. This patent describes a composition for modulating cytokines to regulate an inflammatory or immunomodulatory response. According to the Patent Abstract, "the composition can include at least one of rosehips, blueberry, blackberry, elderberry, cranberry, rosemary, clove, feverfew, nettle root, artichoke, reishi mushroom, olive extract, green tea extract, grape seed extract, resveratrol, *Aframomum melegueta, boswellia serrata* extract, *boswellia forte*, ipriflavone, tocotrienols, evening primrose oil, INM-176, borage oil, krill oil, at least one type of xanthophyll (e.g., astaxanthin), green coffee extract and ferulic acid." The utility of the patent is to regulate an immunomodulatory and/or inflammatory response, and subsequently treat diseases and/or abnormal conditions associated with inflammatory response, for example, cardiovascular conditions, arthritis, osteoporosis and Alzheimer's disease. By "green coffee extract," the composition of U.S. Pat. No. 7,838,050 B2 does not refer to roasted coffee beans or any liquid beverage or extract prepared from them including coffee or instant coffee. Instead, the term "green coffee extract" in U.S. Pat. No. 7,838,050 B2 specifically refers to the chemical compound "chlorogenic acid," or properly spelled chlorogenic acid, which can be extracted from green coffee beans. This fact is firmly established in the patent itself where, in Table 1, many of the ingredients of the patent composition are listed including "Green coffee extract (chlorogenic acid)." Chlorogenic acid is present in green coffee beans but its concentration falls rapidly upon roasting: a 60% decrease in chlorogenic acid concentration is observed under mild roasting conditions while a 100% decrease in concentration is observed under severe roasting conditions [*A study of the effect of roasting on the chlorogenic acid composition of coffee using HPLC*, L. C. Trugo and R. Macrae, Food Chemistry, Volume 15, Issue 3, 1984, Pages 219-227]. As elaborated above, green, unroasted mature and/or immature coffee beans all represent an entirely different composition of matter as compared to roasted coffee beans and the numerous beverage products derived from them. U.S. Pat. No. 7,838,050 B2 does not include roasted coffee beans or beverages prepared them, or beverages of any kind.

U.S. Pat. No. 7,758,903 B2 (filing date: Aug. 23, 2006) by Randolph, et al., is entitled CYTOKINE MODULATORS AND RELATED METHODS OF USE. This patent describes a composition for modulating cytokines to regulate an inflammatory or immunomodulatory response. According to the Patent Abstract, the composition can include at least one of "rosehips, blueberry, blackberry, elderberry, cranberry, rosemary, clove, feverfew, nettle root, artichoke, reishi mushroom, olive extract, green tea extract, grape seed extract, resveratrol, viniferin, *Aframomum melegueta, boswellia serrate* extract, *boswellia forte*, ipriflavone, tocotrienols, evening primrose oil, INM-176, borage oil, krill oil, at least one type of xanthophyll (e.g., astaxanthin), green coffee extract and ferulic acid." As in the previous example, "green coffee extract" in U.S. Pat. No. 7,758,903 B2 does not refer to roasted coffee beans or any liquid beverage or extract prepared from them including coffee or instant coffee. Instead, the term "green coffee extract" in U.S. Pat. No. 7,758,903 B2 specifically refers to the chemical compound "chlorogenic acid," or spelled correctly chlorogenic acid, which can be extracted from green coffee beans. This fact is firmly established in the patent itself where, in Table 1, many of the ingredients of the patent composition are listed including "Green coffee extract (chlorogenic acid)." As elaborated above, chlorogenic acid is present in green coffee beans but its concentration falls rapidly upon roasting: a 60% decrease in chlorogenic acid concentration is observed under mild roasting conditions while a 100% decrease in concentration is observed under severe roasting conditions [*A study of the effect of roasting on the chlorogenic acid composition of coffee using HPLC*, L. C. Trugo and R. Macrae, Food Chemistry, Volume 15, Issue 3, 1984, Pages 219-227]. As elaborated above, green, unroasted mature and/or immature coffee beans all represent an entirely different composition of matter as compared to roasted coffee beans and the numerous beverage products derived from them. U.S. Pat. No. 7,758,903 B2 does not include roasted coffee beans or beverages prepared them or beverages of any kind.

U.S. Pat. No. 8,414,953 (Apr. 9, 2013) claims a soluble coffee product prepared in part from pulverized coffee beans that have not been extracted and therefore represents a unique composition relative to soluble coffee product prepared only from extracted coffee beans. Moreover, U.S. Pat. No. 8,414,953 does not include a formulation containing resveratrol and glycerin leading to improved solubility and bioavailability of resveratrol.

U.S. Pat. No. 8,541,042 (Sep. 24, 2013) entitled "Beverages with enhanced flavors and aromas," by Robinson, at al., claims a soluble coffee product prepared in part from pulverized coffee beans that have not been extracted and therefore represents a unique composition relative to soluble coffee product prepared only from extracted coffee beans. U.S. Pat. No. 8,541,042 does not include a formulation containing resveratrol and glycerin leading to improved solubility and bioavailability of resveratrol. Moreover, U.S. Pat. No. 8,541,042 claims a soluble coffee beverage prepared from pulverized coffee beans and a carbohydrate component. Adding carbohydrates, pulverized coffee and/or other special ingredients to soluble or instant coffee clearly changes its composition of matter and U.S. Pat. No. 8,541,042 lacks a formulation containing resveratrol and glycerin in order to improve the solubility and bioavailability or resveratrol.

U.S. Pat. No. 8,535,748 (Sep. 13, 2013) entitled "Beverages with enhanced flavors and aromas," by Robinson, et al., claims a soluble coffee product prepared in part from pulverized coffee beans that have not been extracted and therefore represents a unique composition relative to soluble coffee product prepared only from extracted coffee beans. U.S. Pat. No. 8,535,748 further claims a soluble coffee beverage prepared from pulverized coffee beans and a flavoring component. U.S. Pat. No. 8,535,748 does not include a formulation containing resveratrol and glycerin leading to improved solubility and bioavailability of resveratrol. Adding flavorings, pulverized coffee and/or other special ingredients to soluble or instant coffee clearly changes its composition of matter.

U.S. Pat. No. 8,524,306 (Sep. 3, 2013) entitled "Beverages with enhanced flavors and aromas," by Robinson, at al., claims a soluble coffee product prepared in part from pulverized coffee beans that have not been extracted and therefore represents a unique composition relative to soluble coffee product prepared only from extracted coffee beans. U.S. Pat. No. 8,524,306 does not include a formulation containing resveratrol and glycerin leading to improved solubility and bioavailability of resveratrol. U.S. Pat. No. 8,524,306 further describes a soluble coffee beverage prepared from pulverized coffee beans and a dairy component. Adding dairy components, pulverized coffee and/or other special ingredients to soluble or instant coffee clearly changes its composition of matter.

Resveratrol

Resveratrol is a chemical compound that is found in numerous natural products including peanuts, Japanese knotweed and red grapes. Both cis-resveratrol and trans-resveratrol are included in the present invention.

Resveratrol has the proper (i.e., scientific) name 3,5,4'-trihydroxystilbene. The compound can exist in two diastereomeric forms: either cis-3,5,4'-trihydroxystilbene or trans-3,5,4'-trihydroxystilbene. The trans-3,5,4'-trihydroxystilbene is known to isomerize to cis-3,5,4'-trihydroxystilbene in the presence of UV light. The chemical structure of these two diastereomeric forms of resveratrol are illustrated in FIG. 1.

As discussed above, resveratrol has antioxidant properties and the inclusion of resveratrol into coffee may provide or is thought to provide health benefits for coffee drinkers.

Resveratrol has a very low solubility in water. Thus, the addition of resveratrol to coffee may have little impact on coffee drinkers as it is unlikely to be fully dissolved and absorbed by the body in sufficient quantities. In order to aid in the absorption of resveratrol into the body, i.e., increase its solubility and bioavailability, the resveratrol on the present invention is part of a formulation that includes glycerin. Resveratrol is at least 48 times more soluble in glycerin than in water. Resveratrol solubilized in glycerin has greatly enhanced bioavailability over resveratrol solubilized in water. See, the Exemplification section, below.

Coffee

The present invention is limited to roasted coffee, whether whole bean or ground, and is not related to green or unroasted coffee. The use of green coffee in the present invention is specifically excluded.

The present invention includes unique compositions of matter comprised of roasted coffee beans and grinds of roasted coffee beans to which a formulation containing resveratrol and glycerin and/or specified additional additives have been added e.g., sprayed onto or infused into (by, for example, dripping, soaking or pressure) as well as any and all extracts prepared from them at pressures less than 2000 Bar, less than 1000 Bar, less than 100 Bar, less than 25 Bar and at about 1 Bar. The pressure generated by an espresso or cappuccino machine (e.g., about 8-10 bar) is included in the present invention. Conventional spray coating and drip coating techniques are known in to one of ordinary skill in the art.

The present invention also includes so-called "instant coffee" or "soluble coffee" to which a formulation containing resveratrol and glycerin and/or specified additional additives have been added prior to and/or after brewing or drying, but without a pulverized coffee component which would otherwise change its composition.

The present invention does not include green or unroasted mature or immature coffee beans, or any extracts derived from green or unroasted mature or immature coffee beans. Green, unroasted mature and/or immature coffee beans all represent an entirely different composition of matter as compared to roasted coffee beans and the numerous beverage products derived from them. Roasting the coffee bean at elevated temperature is accompanied by numerous thermal reactions within the bean leading to changes in chemical composition as compared to the unroasted bean. The chemical compositions of coffee beans before and after roasting are unique and are known to those of ordinary skill in the art. See, for example, Chapters 3 and 4 in *Espresso Coffee, The Science of Quality*, $2^{nd}$ ed., Andrea Illy and Rinantonion Viani, eds., Elsevier Academic Press, 2005.

Roasting is long known to change both the chemical and physical properties of unroasted beans through a series of chemical reactions. Many of these have been studied extensively and are well understood. Many books and scholarly papers describe the chemical changes that take place within the coffee bean during roasting [see also, e.g., Chapter 3 in *Processing and Impact on Antioxidants in Beverages*, Victor R. Preedy, ed., Elsevier, 2014]. These include dehydration and decarboxylation (loss of $CO_2$) reactions; destruction of carbohydrates, chlorogenic acids and trigonelline; isomerizations; polymerizations and complex sugar reactions. The most thermally reactive components within the unroasted coffee bean include monosaccharides and sucrose, chlorogenic acids, free amino acids, and trigonelline. The concentrations of some chemical compounds decrease or even fall to zero during the roasting process (e.g., chlorogenic acids) while, at the same time, a variety of new compounds are formed in, e.g., Maillard reactions. As an example, a detailed study has shown that chlorogenic acid concentrations decrease by 60% under mild roasting conditions and by up to 100% under severe roasting conditions [*A study of the effect of roasting on the chlorogenic acid composition of coffee using HPLC*, L. C. Trugo and R. Macrae, Food Chemistry, Volume 15, Issue 3, 1984, Pages 219-227].

The compositions of roasted coffee beans or grinds of roasted coffee beans and the extract prepared from roasted coffee beans or grinds are also unique. This is obvious given that typically the extract contains only about 1-20% of the original mass of the roasted coffee bean or grinds. The mass transferred to the extraction solvent, typically water, corresponds to the mass of the water soluble substances at the extraction pressure utilized plus some insoluble oils that are emulsified during the extraction process. Moreover, chemical reactions including oxidation take place both during and immediately after the extraction process, creating new compounds and a new composition of matter in the extract relative to the roasted coffee bean or grinds. Thus, the chemical compounds that comprise the extract of roasted coffee beans or grinds are not simply a subset of those found in the roasted coffee bean or grinds. Rather, due to chemical reactions occurring during the extraction, the extract has a unique chemical composition compared to the roasted coffee beans or grinds from which it was prepared.

The exact composition of the extract of roasted coffee beans or grinds is long known to be a function of both the temperature and pressure of extraction [*Espresso Coffee, The Science of Quality*, $2^{nd}$ ed., Andrea Illy and Rinantonion Viani, eds., Elsevier Academic Press, 2005]. Generally speaking, the yield of compounds extracted from the roasted coffee beans or grinds will increase with both temperature and pressure. That is, most organic compounds in the roasted coffee bean or grinds show greater solubility in water that is present at higher temperatures and/or higher pressures. Some compounds will only be extracted at elevated temperature and/or pressure while others, the most water soluble compounds, will be extracted at nearly every temperature and pressure. Thus, the compositions of the extract of roasted coffee beans or grinds vary as a function of both temperature and pressure. Moreover, the outcome of chemical reactions like oxidation that take place both during and immediately after the extraction process depend upon the composition of the extract and more specifically the nature and concentration of compounds present that are prone to oxidation. Therefore, it is clear that the exact composition of the extract will necessarily vary depending upon the temperature and pressure of extraction. In this regard, the coffee of the present invention is extracted at from about 180° F. to about 210° F. or from about 190° F. to about 205° F. Further, the coffee of the present invention is extracted at pressures less than 2000 Bar, less than 1000 Bar, less than 100 Bar, less than 25 Bar and at about 1 Bar. The pressure generated by an espresso or cappuccino machine (e.g., about 8-10 bar) is included in the present invention.

Resveratrol and Glycerin Formulations

A typical formulation of resveratrol and glycerin for spraying and/or infusing resveratrol onto/into coffee beans consists of, consists essentially of, or comprises a mixture of resveratrol and glycerin in a solution whereby the molar ratio of resveratrol to glycerin is between 1:1 and 1:10,000 or 1:100 and 1:5000 or 1:250 and 1:1000 and the solvent is either alcohol or water or a combination of the two. The solution is dripped and/or sprayed onto the roasted coffee bean either immediately after roasting or at a later time with mixing. Conventional spray coating and drip coating techniques are known in to one of ordinary skill in the art. The solvent aids the formulation of resveratrol and glycerin in seeping into the coffee bean and in the bioavailability of resveratrol after consumption. The coffee beans may be at room temperature or an elevated temperature during the treatment. Following evaporation of solvent, at least some of the resveratrol and glycerin is infused into the bean. The remaining resveratrol/glycerin may adhere to the surface of the coffee bean. Soaking the roasted beans or subjecting the roasted beans to pressure during or after spraying or soaking to aid in infusion is also contemplated. The present invention also contemplates roasted coffee and instant coffee sprayed or infused with resveratrol formulated without glycerin.

Resveratrol may be applied to the roasted coffee of the present invention at a concentration of about 10 mg per ounce (about 28 grams) of coffee although the concentration may range from about 0.1 mg to about 1000 mg, or higher, per ounce of coffee, about 0.5 mg to about 100 mg per ounce of coffee or about 5 mg to about 25 mg per ounce of coffee. The determining factor will be controlled by the amount of resveratrol desired in the brewed coffee, as consumed. As discussed previously, the present invention will help coffee drinkers obtain the health benefits available from resveratrol by providing, for example, a substantially equivalent concentration of resveratrol as in a serving of red wine (i.e., about 0.5 to about 1.5 mg), or concentrations ranging higher or lower than 0.5 to 1.5 mg that would be predicted to yield desired benefits. For example, a concentration of resveratrol from about 0.1 mg to about 5.0 mg, to about 10 mg, to about 20 mg, to about 50 mg, to about 100 mg, to about 500 mg or to about 1000 mg of resveratrol or greater, in a serving of coffee is contemplated. Put another way, the resveratrol concentration in a serving of coffee (approximately 8 fluid oz. coffee) can be from about 0.1 times to about 2 times, to about 5 times, to about 10 times, to about 100 times, to about 500 times or to about 1000 times that found in a typical glass of red wine.

A beneficial amount of resveratrol may differ between individuals due to differing needs or differing response to the substance. Individuals may have different needs for the benefits of resveratrol at different times. In other words, the known physiological effects of resveratrol may need to be adjusted based on the needs of an individual. In this sense, different concentrations can be made available to individuals by modulating the quantity of resveratrol applied to the coffee of the present invention.

The concentration of resveratrol applied to the coffee can be controlled (i.e., increased or decreased) by, for example, modulating the ratio of resveratrol to glycerin, as described, Supra, wherein the molar ratio of resveratrol to glycerin can be from 1:1 to 1:10,000. The concentration of resveratrol applied to the coffee can also be modulated by applying a greater or lesser amount of the formula comprising resveratrol and glycerin to the coffee without changing the molar ratio; or by subjecting the coffee to a lesser or greater number of repeated applications after the evaporation of the solvent from the initial or previous application. Further, these methods may be combined in any combination. For example, both the molar ratio and amount may be increased or decreased, individually or in concert, as well as utilizing a desired number of repeated applications. Thus, the amount of resveratrol applied to the coffee can be regulated with great control and precision. This, in turn, regulates the amount of resveratrol made available in the final extract.

Methods

As detailed in the previous sections, the present invention also contemplates methods of use. Such methods include the preparation of the roasted coffee with resveratrol, without or without glycerin; the preparation of an extract of the resveratrol-treated roasted coffee by, for example, brewing the coffee (e.g., by conventional means such as via a coffee percolator, a drip coffee maker, a French press, an espresso or cappuccino machine). Further still, the methods of the present invention include the preparation of instant or soluble coffee from the coffee extract of the present invention by methods known to one of ordinary skill in the art. The methods of the present invention are designed to provide to a coffee drinker resveratrol without the need to consume red wine.

EXEMPLIFICATION

Example 1

In one embodiment, a formulation containing resveratrol and glycerin or other specified additive(s) is spray coated or drip coated onto roasted coffee beans using a solution of resveratrol and glycerin or other specified additive(s) in suitable solvent. Food-grade and/or pharmaceutical-grade resveratrol and glycerin are readily available from commercial sources known to one of ordinary skill in art such as health food stores and pharmacies (e.g., www.bulkapothecary.com; www.gnc.com; www.starwest-botanicals.com). Following evaporation of the solvent, the resulting roasted coffee beans with resveratrol or other specified additive(s) is ground and then extracted with water at a pressure of less than 2000 Bar. The resulting extract, fortified in resveratrol or other specified additive(s) is then consumed for enjoyment.

The solubility of resveratrol in water is rather poor, approximately 3 mg/100 mL. This low solubility inhibits adequate, reproducible absorption from the gastrointestinal tract. For this reason, poor solubility is closely associated with low bioavailability. The solubility of resveratrol in glycerin has been tested using UV/vis spectroscopy. It is found that resveratrol is at least 48 times more soluble in glycerin that in water (≥144 mg/100 mL). In order to understand the increased solubility and bioavailability of resveratrol in glycerin, computational chemistry investigations were performed. Computational chemistry suggests that the enhanced solubility and bioavailability of resveratrol in the presence of glycerin is due at least in part to intermolecular H-bonding interactions. Glycerin engages in H-bonding interactions at both ends of the molecule, forming a 2:1 H-bonding complex.

Example 2

Resveratrol Recovery Experiment 3 ounce (oz.) (85 grams) of medium roast coffee whole beans were infused with a formulation containing 30 milligrams of resveratrol and 25 milligrams of glycerin. Following infusion, the whole beans were allowed to age at room temperature for 30 minutes and then ground using a commercial grinder set at the "auto drip" setting. After grinding, 2.5 oz. was placed in a piece of filter paper and brewed in a commercial auto drip coffee maker using 10 cups of water. The temperature of the water used during brewing was approximately 200° F. (93° C.).

The brewed coffee filtrate was collected, cooled and prepared for NMR (nuclear magnetic resonance) spectroscopy to determine resveratrol recovery. The brewed coffee was extracted with ethyl acetate four times. Brine was added to reduce the emulsion that formed during extraction. The combined ethyl acetate extracts were subsequently extracted with water to remove caffeine and glycerin, and then dried over anhydrous sodium sulfate. The solid $Na_2SO_4$ was removed by filtration and rinsed using additional ethyl acetate. The combined, dry ethyl acetate extracts were placed in a round bottom flask. The ethyl acetate was removed via rotary distillation. The solids that remained in the flask were massed, dissolved in deuterated chloroform, $CDCl_3$, and studied by $^1H$ NMR spectroscopy. The $^1H$ NMR spectrum revealed the presence of both resveratrol and caffeine. The spectrum was integrated to reveal their molar ratio (~1:1), from which a lower limit of the mass of resveratrol extracted from 2.5 oz. of infused ground coffee using standard brewing conditions was determined to be 10 milligrams (40% yield relative to the mass of resveratrol [25 mg] in the original 2.5 oz. portion of infused, ground coffee). Thus, approximately 1 milligram of resveratrol would be delivered per cup (8 ounces) of coffee prepared in this manner. For comparison purposes, the mass of resveratrol delivered in a typical glass (~5.3 fluid ounces) of red wine ranges from approximately 0.5 to 1.5 milligrams, as is known in the art. With the teachings of this specification, one of skill in the art would understand that the concentration of resveratrol recovered in brewed coffee could be increased by increasing the amount of resveratrol used in treating a specific amount of roasted coffee.

What is claimed is:

1. A composition comprising roasted coffee to which a formulation consisting essentially of resveratrol and glycerin has been added.

2. The composition of claim 1, wherein green coffee is specifically excluded from the composition.

3. The composition of claim 1, wherein said roasted coffee is in whole bean or ground form.

4. The composition of claim 1, wherein one or more additional additives selected from the group consisting of ground or pulverized cocoa beans, ground or pulverized vanilla beans, vitamins including vitamin D, antioxidants, nutraceuticals, dietary fiber, an omega-3 oil, an omega-6 oil, an omega-9 oil, a flavonoid, lycopene, selenium, beta-carotene, vegetable extracts, hawthorn berry, nattokinase, fish oil, co-enzyme Q-10, garlic, niacin, magnesium, and guggul are added.

5. The composition of claim 1, wherein said formulation containing resveratrol and glycerin is drip coated and/or spray coated onto roasted coffee beans.

6. The composition of claim 1, wherein said formulation containing resveratrol and glycerin has molar ratio of between 1:1 and 1:10,000 of resveratrol and glycerin.

7. The composition of claim 1, wherein said formulation contains resveratrol at a concentration of about 0.1 mg to about 1000 mg per 28 grams of roasted coffee.

8. The composition of claim 1, wherein said formulation contains resveratrol at a concentration of about 10 mg per 28 grams of roasted coffee.

9. A composition comprising a liquid extract, said liquid extract being produced by subjecting the composition of claim 1 to an aqueous solution at a pressure of less than about 2000 bar.

10. A composition produced by drying the liquid extract of claim 9.

11. The composition of claim 9, wherein an unextracted pulverized coffee component is specifically excluded from the composition.

12. A method to produce a composition of matter comprising roasted coffee to which a formulation consisting essentially of resveratrol and glycerin has been added, the method comprising spraying the formulation of resveratrol and glycerin onto the roasted coffee using a spray coating technique.

13. The method of claim 12, wherein the formulation containing resveratrol and glycerin has a molar ratio of between 1:1 and 1:10,000 of resveratrol and glycerin.

14. The method of claim 12, wherein said formulation contains resveratrol at a concentration of about 0.1 mg to about 1000 mg per 28 grams of roasted coffee.

15. The method of claim 12, wherein said formulation contains resveratrol at a concentration of about 10 mg per 28 grams of roasted coffee.

16. A method to produce a composition of matter comprising roasted coffee to which a formulation consisting essentially of resveratrol and glycerin has been added, the method comprising drip coating the formulation of resveratrol and glycerin onto the roasted coffee using a drip coating technique.

17. The method of claim 16 wherein the formulation containing resveratrol and glycerin has a molar ratio of between 1:1 and 1:10,000 of resveratrol and glycerin.

18. The method of claim 16, wherein said formulation contains resveratrol at a concentration of about 0.1 mg to about 1000 mg per 28 grams of roasted coffee.

19. The method of claim 16, wherein said formulation contains resveratrol at a concentration of about 10 mg per 28 grams of roasted coffee.

20. A composition of matter comprised of "instant coffee" or "soluble coffee" prepared from roasted coffee beans to which a formulation consisting essentially of resveratrol and glycerin has been added.

21. The composition of claim 20, wherein an unextracted pulverized coffee component is specifically excluded from the composition.

22. The composition of claim 20, wherein the formulation containing resveratrol and glycerin has a molar ratio of between 1:1 and 1:10,000 of resveratrol and glycerin.

23. The composition of claim 20, wherein said formulation contains resveratrol at a concentration of about 0.1 mg to about 1000 mg per 28 grams of roasted coffee.

24. The composition of claim 20, wherein said formulation contains resveratrol at a concentration of about 10 mg per 28 grams of roasted coffee.

* * * * *